US006281647B1

(12) United States Patent
Sasaki

(10) Patent No.: US 6,281,647 B1
(45) Date of Patent: Aug. 28, 2001

(54) POWER WINDOW APPARATUS

(75) Inventor: Akira Sasaki, Miyagi-ken (JP)

(73) Assignee: Alps Electric Co., Ltd., Tokyo (JP)

(*) Notice: Subject to any disclaimer, the term of this patent is extended or adjusted under 35 U.S.C. 154(b) by 0 days.

(21) Appl. No.: 09/457,586

(22) Filed: Dec. 9, 1999

(30) Foreign Application Priority Data

Dec. 11, 1998 (JP) ........................................ 10-353218

(51) Int. Cl.[7] ........................................ H02P 7/00

(52) U.S. Cl. .................... 318/264; 318/265; 318/280; 318/283; 318/281; 318/483; 180/10.1

(58) Field of Search .................... 318/264, 265, 318/280, 283, 483, 284, 286, 282; 180/281; 307/10.1

(56) References Cited

U.S. PATENT DOCUMENTS

| | | | | |
|---|---|---|---|---|
| 5,321,345 | * | 6/1994 | Lambrose et al. | 318/483 |
| 5,547,208 | * | 8/1996 | Chappell et al. | 180/281 |
| 5,773,942 | * | 6/1998 | Takahara et al. | 318/280 |
| 5,990,573 | * | 11/1999 | Granitz et al. | 307/10.1 |
| 6,072,290 | * | 6/2000 | Takagi et al. | 318/283 |
| 6,111,373 | * | 8/2000 | Ohashi | 318/265 |

FOREIGN PATENT DOCUMENTS

| | | |
|---|---|---|
| Hei-7-230736 | 8/1995 | (JP) . |
| Hei-8-203399 | 8/1996 | (JP) . |

* cited by examiner

*Primary Examiner*—Robert E. Nappi
*Assistant Examiner*—Tyrone Smith
(74) *Attorney, Agent, or Firm*—Brinks Hofer Gilson & Lione

(57) ABSTRACT

The power window apparatus has a driver's seat side window operating unit and passenger seat side window operating units that have window open/close motors. Each of the window operating units has a window open switch, a window close switch, motor drive means, and motor drive control means for controlling the motor drive means. At least one of the window operating units has submersion detecting means for outputting a submersion detection signal when the submersion of the automobile is detected. The window operating units have signal transmission terminals that transmit and/or receive the submersion detection signal generated by the submersion detecting means.

16 Claims, 6 Drawing Sheets

POWER WINDOW APPARATUS

BACKGROUND OF THE INVENTION

1. Field of the Invention

The present invention relates generally to a power window apparatus and, more particularly, to a power window apparatus for opening the windows of an automobile by a manual operation when the automobile has been submerged in water by for some reason.

2. Description of the Related Art

In generally known power window apparatuses for use in automobiles, the window operating unit is arranged in the door pocket of the driver's side door, each of the door pockets of the passenger side door, or driver's side door and the door pockets of the driver's side door, passenger side door, and the rear seat door.

Each of these operating units in each of the known power window apparatuses comprises a window open switch, a window close switch, a motor for window opening/closing at the time of rotation, and a motor driver circuit for driving the motor by switching between the motor rotational directions according to the operations of the window open switch and the window close switch.

If an automobile equipped with such a power window apparatus has been submerged in water for some reason and the water gets inside the automobile, the water also gets in the door pocket in which the window operating unit is located, eventually submerging the window open switch and the window close switch. If the window open switch and the window close switch are submerged, it becomes difficult for the contacts used in these switches to maintain electrical isolation. If this happens, although each contact is in the break state, the water between the contacts forms a comparatively small resistance which causes the motor driver circuit to operate erroneously, opening or closing the window out of control. In addition, in such a state, because the motor driver circuit block including the window open switch does not operate correctly, operating the window open switch does not make the window open, making it difficult for those trapped inside the submerged automobile to escape.

Recently, for the purpose of eliminating the above-mentioned problem, a power window apparatus has been proposed by the applicant hereof in which a window operating unit arranged in the door pocket on the driver's seat is connected to a submersion detector and a drive control circuit for anti-flooding measures.

The above-mentioned proposed power window apparatus, if an automobile equipped therewith has been submerged in water for some reason and the water gets in the door pocket on the door on the driver's seat, the submersion detector arranged in the window operating unit on the driver's seat side detects the submersion, generates a submersion detection signal, and sends the signal to the drive control circuit. In response, the drive control circuit takes anti-flooding measures. Then, if the window open switch of the window operating unit on the driver's seat side is in the submerged state, the drive control circuit drives the motor to open the window of the driver's seat if the window open switch of the window operating unit on the driver's seat is manually operated within a certain period of time after the submersion took place, allowing the window on the driver's seat to open, and thus allow those trapped inside the submerged automobile to escape through this opened window.

The above-mentioned proposed power window apparatus allows the window on the driver's seat to open within a certain period of time by manually operating the window open switch of the window operating unit positioned near the driver's seat after the automobile has been submerged in water, even when water is getting in the door pocket of the door on the driver's seat.

If water gets inside the automobile, submerging the door pockets located near the driver's seat, the passenger seat, and the rear seats, the above-mentioned power window apparatus can take an anti-flooding measure only for the operating unit located near the driver's seat. Because the submersion detector and drive control circuit are connected only to the window operating unit located near the driver's seat, anti-flooding measures are not provided to the other window operating units. Therefore, if the water penetrates the window open switch of the window operating unit located near the passenger seat, and the rear seats, the manual operation of the window open switch on the side of these seats will not function, making it difficult for passengers to escape from the passenger and rear seats.

SUMMARY OF THE INVENTION

It is therefore an object of the present invention to provide a power window apparatus having a high operational reliability capable of surely opening the window on the side of each seat in an automobile by operating the window open switch of the window operating unit on the side of each seat when the automobile has been submerged and flooded with water.

In carrying out the invention and according to one aspect thereof, there is provided a power window apparatus comprising a driver's seat side window operating unit and a passenger's seat side window operating unit, each of these units comprising a manually operated window open switch, a manually operated window close switch, a motor driving means for driving a motor for executing window opening and closing operations, and a motor drive control means for drivably controlling the motor driving means according to the operations of the window open switch and the window close switch, at least one of the driver's seat side window operating unit and the passenger's seat side window operating unit having a submersion detecting means for generating a submersion detection signal upon detection of submersion, the driver's seat side window operating unit and the passenger's seat side window operating unit each having a means to which a signal transmission terminal capable of transmitting and/or receiving the submersion detection signal is arranged.

According to the above-mentioned means, when the inside of a submerged automobile has been flooded, the submersion detecting means arranged in any one of the driver's seat side window operating unit and the passenger's seat side window operating unit detects the submersion and outputs the submersion detection signal. This signal is supplied to the drive control means of the window operating unit of the window and, at the same time, to the drive control means of the other window operating units through the signal transmission terminal and the signal transmission path. Consequently, anti-flooding measures can be taken on any window operating unit. Operating the window open switch of the window operating unit concerned allows each person trapped in the submerged automobile to open their own window for escape.

In the present invention, all of the driver's seat side window operating unit and the passenger's seat side window operating unit of the power window apparatus have each the submersion detecting means.

Thus, according to the embodiments of the present invention, the motor drive means of the driver's seat side window operating unit and the passenger's seat side window operating units are all supplied with a submersion detection signal, so that anti-flooding measure can be taken on each seat side. Manually operating the window open switch of the window operating unit on the side of one seat opens the window of the door on the side of the seat, allowing occupants who are trapped in the submerged automobile to escape through the opened window or windows.

In the present invention, if any one of the submersion detecting means in the driver's seat side window operating unit and the passenger's seat side window operating unit has generated a submersion detection signal, the power window apparatus receives by the motor drive control means the submersion detection signal through the signal transmission terminal.

According to one embodiment of the present invention, the submersion detecting means is arranged in each of the driver's seat side window operating unit and the passenger's seat side window operating units. Consequently, by use of the submersion detection signal generated by the submersion detecting means that first detected the submersion, all the other window operating units can take anti-flooding measures earlier than they detect the submersion. Therefore, those who are trapped in the submerged automobile can immediately open the windows on their seat side, and quickly escape through the opened window.

In the present invention, the power window apparatus has a signal transmission line connected between the signal transmission terminal of the driver's seat side window operating unit and the signal transmission terminal of the passenger's seat side window operating unit. The submersion detection signal is constituted by a direct-current voltage that is transmitted over the signal transmission line.

Further, according to another specific embodiment of the present invention, the submersion detection signal constituted by a direct-current voltage is supplied to the other window operating units through the signal transmission terminal, thereby enhancing the reliability of the anti-flooding capabilities in the case of submersion.

In the present invention, the signal transmission terminal of the power window apparatus is a bus line connection terminal connected to a multiplexed signal transmission bus line connected in advance between the driver's seat side window operating unit and the passenger's seat side window operating unit and the submersion detection signal is constituted by an information signal that is transmitted over the bus line as multiplexed with other signals.

In addition, according to still another specific embodiment of the present invention, the submersion detection signal constituted by an information signal is supplied to the other window operating units over a previously installed bus line in a time division manner with other signals, thereby eliminating the necessity of separately providing the signal transmission path and enhancing the reliability of the anti-flooding capabilities in the case of submersion.

According to the present invention, a motor drive control means is arranged in each of the driver's seat side window operating unit in the driver's seat side door pocket and the window operating unit in the passenger's side seat door pocket, a submersion detecting means is arranged in at least one of the driver's seat side window operating unit and the passenger's seat side window operating unit, and a signal transmission terminal capable of transmitting a submersion detection signal is arranged between the motor drive control means of the driver's seat side window operating unit and the passenger's seat side window operating unit. Consequently, when the automobile has been submerged in water for some reason, the inside thereof being flooded, the submersion detecting means arranged at least one of the window operating units detects the flooding and generates a submersion detection signal, the signal is supplied to the drive control means of the window operating unit located near one seat and, at the same time, to the drive control means of the other window control units through the signal transmission terminal.

MODE FOR CARRYING OUT THE INVENTION

The following describes the mode for carrying out the invention with reference to the accompanying drawings.

Figure 1:
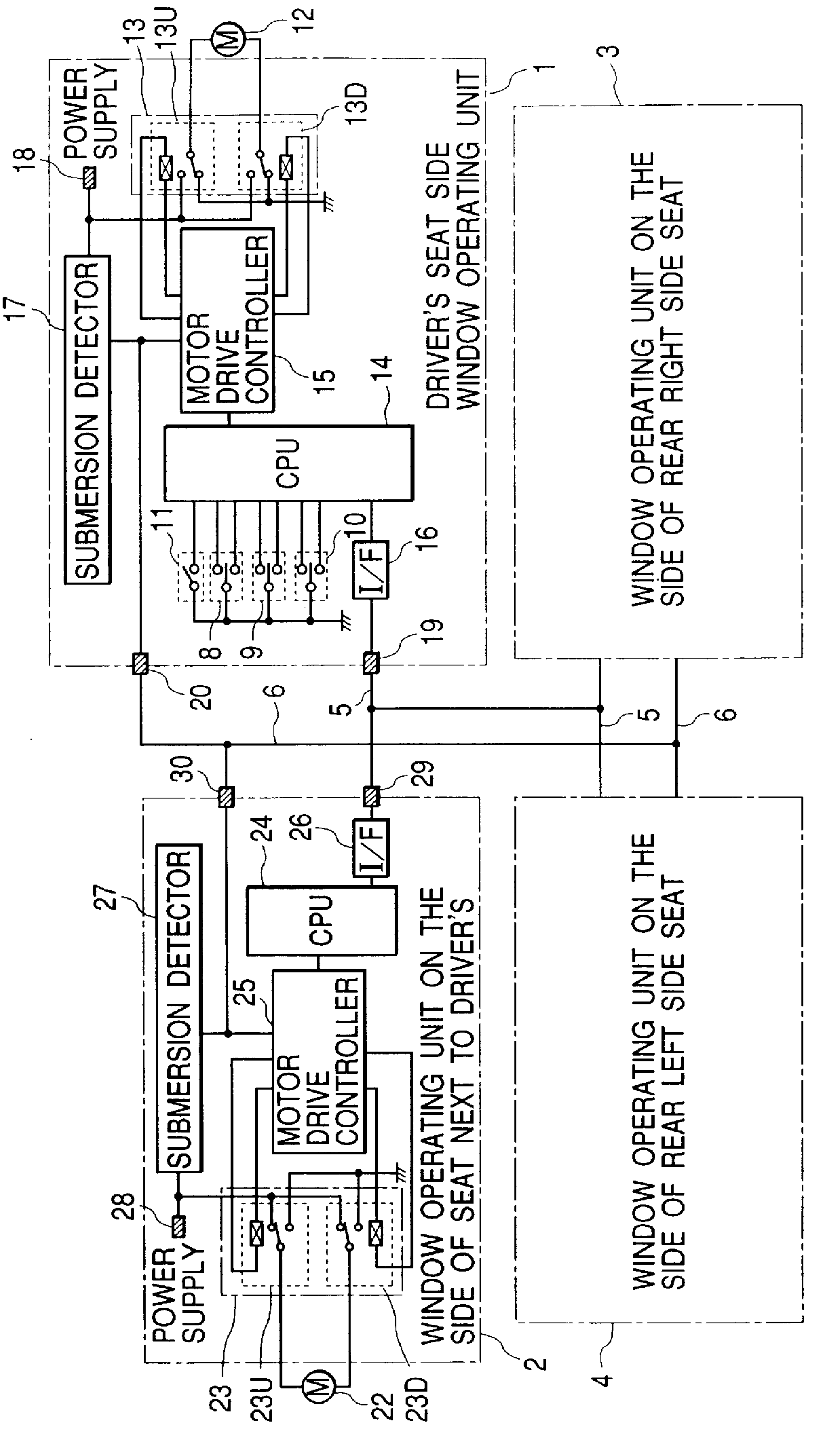
FIG. 1 is a circuit diagram illustrating the configuration of the main portion of a power window apparatus practiced as first mode for carrying out the invention.
Figure 2:
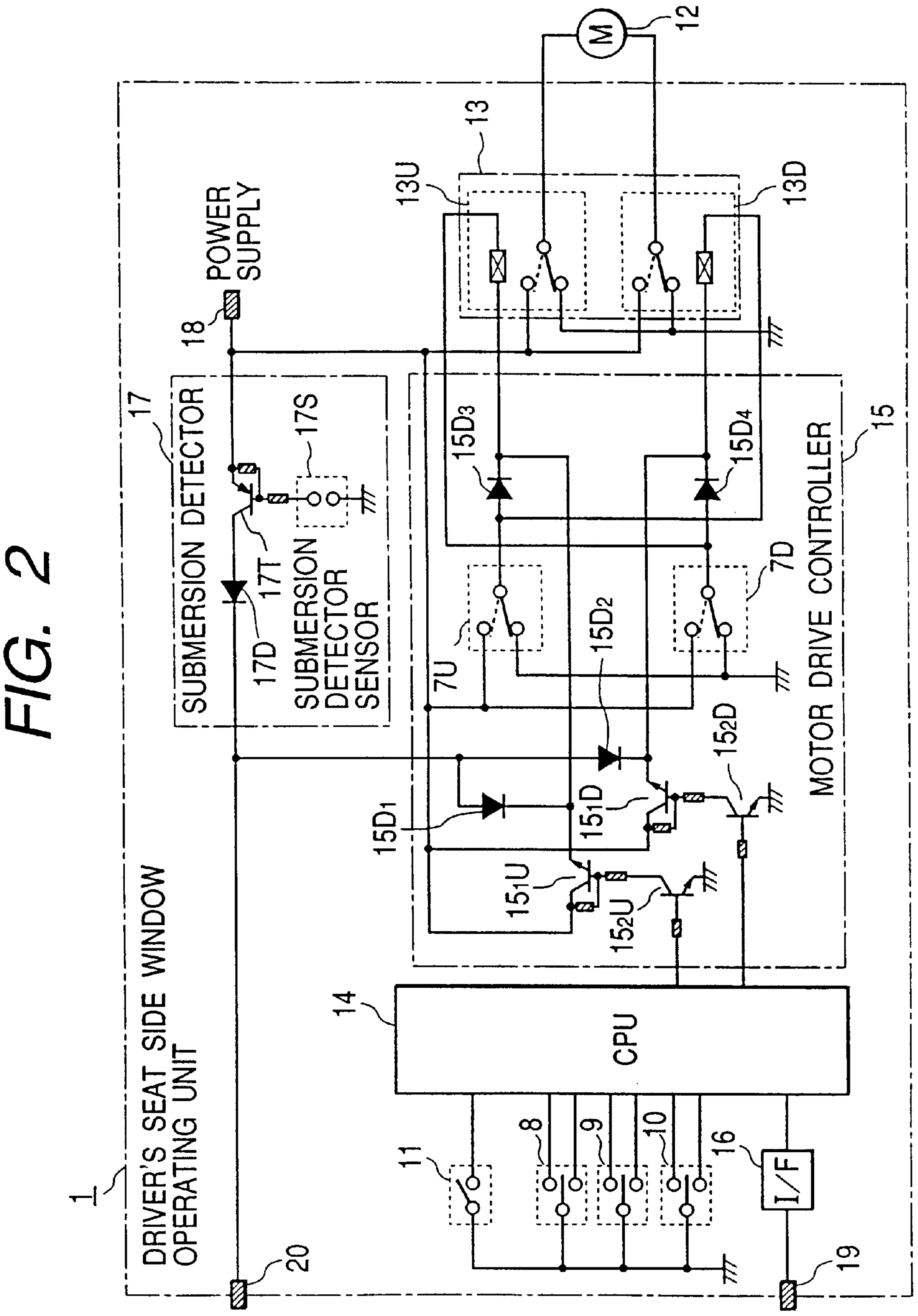
FIG. 2 is a circuit diagram illustrating the detail configuration of the driver's seat side window operating unit in the power window apparatus shown in FIG. 1.
Figure 3:
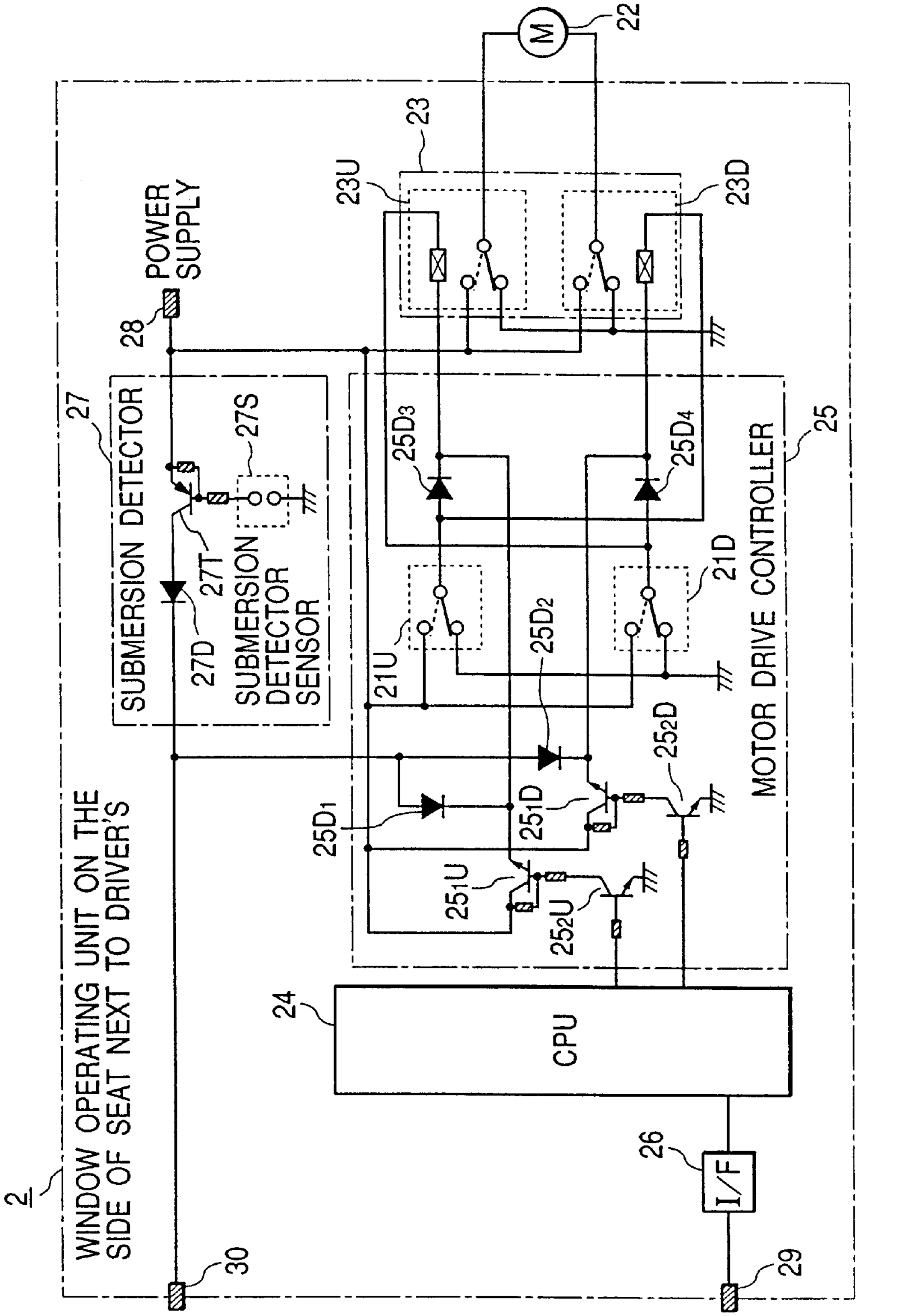
FIG. 3 is a circuit diagram illustrating the detailed configuration of the window operating unit on the side of the seat next to the driver's in the power window apparatus shown in FIG. 1.

FIG. 1 is a circuit diagram illustrating the configuration of the main portion of a power window apparatus practiced as a first mode for carrying out the invention. FIG. 2 is a circuit diagram illustrating the detail configuration of the driver's seat side window operating unit in the power window apparatus as the first mode shown in FIG. 1. FIG. 3 is a circuit diagram illustrating the detailed configuration of the window operating unit on the side of the seat next to the driver's in the power window apparatus as the first mode shown in FIG. 1.

As shown in FIG. 1, the power window apparatus of the mode for carrying out the invention comprises a driver's seat side window operating unit 1, a next-to-driver side seat window operating unit 2, a rear right seat side window operating unit 3, a rear left seat side window operating unit 4, a bus line 5, and a signal transmission line 6.

Referring to FIGS. 1 and 2, the driver's seat side window operating unit 1 comprises a driver's seat side window open switch 7D of one-circuit two contact configuration, a driver's seat side window close switch 7U of one-circuit two-contact configuration, a next-to-driver seat side window open/close switch 8 of one-circuit two-contact configuration, a rear right seat side window open/close switch 9 of one-circuit two-contact configuration, a rear left seat side window open/close switch 10 of one-circuit two-contact configuration, an auto switch 11 of one-circuit one-contact configuration, a motor rotational direction selector relay 13, a controller (CPU) 14, a motor drive controller 15, an interface (I/F) 16, a submersion detector 17, a power supply terminal 18, a bus line connector terminal 19, and a signal transmission line connector terminal 20. The motor rotational direction selector relay 13 comprises a window close relay 13U of one-circuit two-contact configuration and a window open relay 13D of one-circuit two-contact configuration. The motor drive controller 15 comprises transistors $15_1$U and $15_2$U for driving the window close relay 13U, transistors $15_1$D and $15_2$D for driving the window open relay 13D, and four buffer diodes $15D_1$, $15D_2$, $15D_3$, and $15D_4$. The submersion detector 17 comprises a submersion detector sensor 17S, a submersion detecting transistor 17T, and one buffer diode 17D. The various components 7D, 7U, 8 through 20 of the driver's seat side window operating unit 1 are interconnected as shown in FIGS. 1 and 2. It should be noted that the window close relay 13U and the window open relay 13D are connected between both ends of a window open/close motor 12.

As shown in FIGS. 1 and 3, the next-to-driver seat side window operating unit 2 comprises a next-to-driver seat side window open switch 21D of one-circuit two contact configuration, a next-to-driver seat side window close switch 21U of one-circuit two-contact configuration, a motor rotational direction selector relay 23, a controller (CPU) 24, a motor drive controller 25, an interface (I/F) 26, and a submersion detector 27, a power supply terminal 28, a bus line connector terminal 29, and a signal transmission line connector terminal 30. The motor rotational direction selector relay 23 comprises a window close relay 23U of one-circuit two-contact configuration and a window open relay 23D of one-circuit two-contact configuration. The motor drive controller 25 comprises transistors $25_1$U and $25_2$U for driving the window close relay 23U, transistors $25_1$D and $25_2$D for driving the window open relay 23D, and four buffer diodes $25D_1$, $25D_2$, $25D_3$ and $25D_4$. The submersion detector 27 comprises a submersion detector sensor 27S, a submersion detecting transistor 27T, and a buffer diode 27D. The various components 21D, 21U, 22 through 30 of the next-to-driver seat side window operating unit 2 are interconnected as shown in FIGS. 1 and 3. It should be noted that the window close relay 23U and the window open relay 23D are connected between both ends of a window open/close motor 22.

Although not specifically shown in FIG. 1, the rear right seat side window operating unit 3 and the rear left seat side window operating unit 4 are identical in circuit configuration, which is the circuit configuration of the next-to-driver seat side window operating unit 2 shown in FIG. 3 minus the submersion detector 27.

As shown in FIG. 1, the bus line 5 is connected between the bus line connector terminal 19 of the driver's seat side window operating unit 1 and the bus line connector terminal 29 and between a bus line connector terminal (not shown) of the rear right seat side window operating unit 3 and a bus line connector terminal (not shown) of the rear left seat side window operating unit 4. The signal transmission line 6 is connected to the signal transmission line connector terminal 20 of the driver's seat side window operating unit 1, the signal transmission line connector terminal 30 of the next-to-driver seat side window operating unit 2, a signal transmission line connector terminal (not shown) of the rear right side seat window operating unit 3, and a signal transmission line connector terminal (not shown) of the rear left seat side window operating unit 4.

The following operations are performed by the power window apparatus practiced as the first mode for carrying out the invention.

First, the operation that will take place when an automobile is in a normal condition (namely, not in a flooded condition) will be described.

When the driver manually operates the driver's seat side window close switch 7U of the driver's seat side window operating unit 1, the contacts of the driver's seat side window close switch 7U are switched from a state denoted by solid line to a state denoted by dashed line as shown in FIG. 2, upon which a positive voltage supplied from the power supply terminal 18 is supplied to the window close relay 13U of the motor rotational direction selector relay 13 through the switched driver's seat side window close switch 7U and the buffer diode $15D_3$, thereby switching the contacts of the window close relay 13U from a state denoted by solid line to a state denoted by dashed line as shown in FIG. 2. At this moment, the window open/close motor 12 is supplied with the positive voltage from the power supply terminal 18 through the switched contacts of the window close relay 13U. The window open/close motor 12 rotates in one direction to close the driver's seat side window linked to the window open/close motor 12.

On the other hand, when the driver manually operates the driver's seat side window open switch 7D of the driver's seat side window operating unit 1, the contacts of the driver's seat side window open switch 7D are switched from a state denoted by solid line to a state denoted by dashed line, upon which a positive voltage supplied to the power supply terminal 18 is supplied to the window open relay 13D of the motor rotational direction selector relay 13 through the switched driver's seat side window open switch 7D and the buffer diode $15D_4$, thereby switching the contacts of the window open relay 13D from a state denoted by solid line to a state denoted by dashed line as shown in FIG. 2. At this moment, the window open/close motor 12 is supplied with the positive voltage from the power supply terminal 18 through the switched contacts of the window close relay 13D. The window open/close motor 12 rotates in the other direction to open the driver's seat side window.

When the driver manually operates the next-to-driver seat side window open/close switch 8 such that to close the next-to-driver seat side window, the controller 14 detects this operation of the next-to-driver seat side window open/close switch 8 and generates a first control information signal for closing the next-to-driver seat side window. The first control information signal is transmitted to the next-to-driver seat side window operating unit 2 through the interface 16, the bus line connector terminal 19 and the bus line 5 connected thereto. Receiving at the bus line connector terminal 29 the first control information signal transmitted over the bus line 5, the next-to-driver seat side window operating unit 2 supplies the signal to the controller 24 through the interface 26. In response to the supplied signal, the controller 24 supplies a drive signal to the transistor $25_2$U to bring the same into conduction, which in turn brings the transistor $25_1$U into conduction. The positive voltage supplied from the power supply terminal 28 is supplied to the window close relay 23U of the motor rotational direction selector relay 23 through the conducted transistor $25_1$U, thereby switching the contacts of the window close relay 23U from a state denoted by solid line to a state denoted by dashed line as shown in FIG. 3. At this moment, the window open/close motor 22 is supplied with the positive voltage from the power supply terminal 28 through the switched contacts of the window close relay 23U, upon which the window open/close motor 22 rotates in one direction, thereby closing the next-to-driver seat side window.

On the other hand, when the driver manually operates the next-to-driver seat side window open/close switch 8 such that to open the next-to-driver seat side window, the controller 14 detects this operation of the next-to-driver seat side window open/close switch 8 and generates a second control information signal for opening the next-to-driver seat side window. The second control information signal is transmitted to the next-to-driver seat side window operating unit 2 through the interface 16, the bus line connector terminal 19 and the bus line 5 connected thereto. Receiving at the bus line connector terminal 29 the second control information signal transmitted over the bus line 5, the next-to-driver seat side window operating unit 2 supplies the signal to the controller 24 through the interface 26. In response to the supplied signal, the controller 24 supplies a drive signal to the transistor 25$_2$D to bring the same into conduction, which in turn brings the transistor 25$_1$D into conduction. The positive voltage supplied from the power supply terminal 28 is supplied to the window open relay 23D of the motor rotational direction selector relay 23 through the conducted transistor 25$_1$D, thereby switching the contacts of the window open relay 23D from a state denoted by solid line to a state denoted by dashed line as shown in FIG. 3. At this moment, the window open/close motor 22 is supplied with the positive voltage from the power supply terminal 28 through the switched contacts of the window open relay 23D, upon which the window open/close motor 22 rotates in the other direction, thereby opening the next-to-driver seat side window.

Further, when the driver manually operates the rear right seat side window open/close switch 9 in the direction for closing the rear right seat side window, the controller 14 generates a third control information signal for closing the rear right seat side window, the generated signal being supplied to the rear right seat side window operating unit 3 through the bus line 5. In response to the supplied third control information signal, the rear right seat side window operating unit 3 operates such that the rear right seat side window is closed in the same manner as that of closing the next-to-driver seat side window operating unit 2.

On the other hand, when the driver manually operates the rear right seat side window open/close switch 10 in the direction for opening the rear right seat side window, the controller 14 generates a fourth control information signal for closing the rear right seat side window, the generated signal being supplied to the rear right seat side window operating unit 3 through the bus line 5. In response to the supplied fourth control information signal, the rear right seat side window operating unit 3 operates such that the rear right seat side window is opened in the same manner as that of opening the next-to-driver seat side window operating unit 2.

When the driver manually operates the rear left seat side window open/close switch 10 in the direction for closing the rear left seat side window, the controller 14 generates a fifth control information signal for closing the rear left seat side window, the generated signal being supplied to the rear left seat side window operating unit 4 through the bus line 5. In response to the supplied fifth control information signal, the rear left seat side window operating unit 4 operates such that the rear left seat side window is closed in the same manner as that of closing the next-to-driver seat side window operating unit 2.

On the other hand, when the driver manually operates the rear left seat side window open/close switch 10 in the direction for opening the rear left seat side window, the controller 14 generates a sixth control information signal for opening the rear left seat side window, the generated signal being supplied to the rear left seat side window operating unit 4 through the bus line 5. In response to the supplied sixth control information signal, the rear left seat side window operating unit 4 operates such that the rear left seat side window is opened in the same manner as that of opening the next-to-driver seat side window operating unit 2.

In addition, when the passenger next to the driver manually operates the next-to-driver seat side window close switch 21U of the next-to-driver seat side window operating unit 2, the contacts of the next-to-driver seat side window close switch 21U are switched from a state denoted by solid line to a state denote by dashed line as shown in FIG. 3. Then, a positive voltage supplied to the power supply terminal 28 is supplied to the window close relay 23U of the motor rotational direction selector relay 23 through the switched next-to-driver seat side window close switch 21U and the buffer diode 25D$_3$, upon which the window open/close motor 22 is supplied with the positive voltage from the power supply terminal 28 through the switched contacts of the window close relay 21U to rotate the window open/close motor 22 in one direction, thereby closing the next-to-driver seat side window.

On the other hand, when the passenger next to the driver manually operates the next-to-driver seat side window open switch 21D of the next-to-driver seat side window operating unit 2, the contacts of the next-to-driver seat side window close switch 21D are switched from a state denoted by solid line to a state denote by dashed line as shown in FIG. 3. Then, a positive voltage supplied to the power supply terminal 28 is supplied to the window close relay 23D of the motor rotational direction selector relay 23 through the switched next-to-driver seat side window close switch 21D and the buffer diode 25D$_4$, upon which the window open/close motor 22 is supplied with the positive voltage from the power supply terminal 28 through the switched contacts of the window close relay 21D to rotate the window open/close motor 22 in the other direction, thereby closing the next-to-driver seat side window.

Although not shown in FIG. 1, when the passenger of the rear right seat manually operates the rear right side seat window close switch of the rear right seat side window operating unit 3 or the passenger in the rear left seat manually operates the rear left seat side window close switch of the rear left seat side window operating unit 4, these window operating units operate such that the rear right seat side window and the left seat side window are closed respectively in the same manner as when the next-to-driver seat side close switch 21U of the next-to-driver seat side window operating unit 2 is manually operated.

On the other hand, when the passenger of the rear right seat manually operates the rear right side seat window open switch of the rear right seat side window operating unit 3 or the passenger in the rear left seat manually operates the rear left seat side window open switch of the rear left seat side window operating unit 4, these window operating units operate such that the rear right seat side window and the rear left seat side window are opened respectively in the same manner as when the next-to-driver seat side open switch 21D of the next-to-driver seat side window operating unit 2 is manually operated.

It should be noted that, when the automobile is used in a normal condition, neither the submersion detector sensor 17S of the submersion detector 17 of the driver's seat side window operating unit 1 nor the submersion detector sensor 27S of the submersion detector 27 of the next-to-driver seat side window operating unit 2 detects flooding. The terminal-to-terminal resistance of the submersion detector sensor 17S and the submersion detector sensor 27S is extremely high, so that the submersion detecting transistor 17T and the submersion detecting transistor 27T are in non-conducting state, no submersion detection signal being outputted from the submersion detector 17 and the submersion detector 27.

The following describes the operation of the power window apparatus practiced as the first embodiment of the invention to be performed when the automobile has been submerged in water for some reasons and flooded (an emergence state).

When flooding inside the automobile begins, the driver's seat side door pocket, the next-to-driver seat side door pocket, the rear right seat side door pocket, and the rear left seat side door pocket are flooded, which in turn floods the driver's seat side window operating unit 1, the next-to-driver seat side window operating unit 2, the rear right seat side window operating unit 3, and the rear left seat side window operating unit 4. In this case, immediately after the flooding inside the automobile started, one of the exposed submersion detector sensor 17S of the submersion detector 17 in the driver's seat side window operating unit 1 and the exposed submersion detector sensor 27S of the submersion detector 27 in the next-to-driver seat side window operating unit 2 detects the flooding. For example, when the water gets between the pair of submersion detecting contacts of the submersion detector sensor 17S, the resistance between these contacts lowers, the resistance of the base circuit of the submersion detecting transistor 17T lowers in terms of direct current, the submersion detecting transistor 17T conducts, and the submersion detector 17 outputs a submersion detection signal having a direct-current voltage value approximate to the power supply voltage. The outputted submersion detection signal is supplied to the motor drive controller 15 of the driver's seat side window operating unit 1 and, at the same time, to the motor drive controller 25 of the next-to-driver seat side window operating unit 2, the motor drive controller (not shown) of the rear right seat side window operating unit 3, and the motor drive controller (not shown) of the rear left seat side window operating unit 4 through the signal transmission line 6 from the signal transmission line connector terminal 20.

In this case, the submersion detection signal supplied to the motor drive controller 15 of the driver's seat side window operating unit 1 is supplied to the window open relay 13D and the window close relay 13U of the motor rotational direction selector relay 13 through the buffer diodes $\mathbf{15}D_1$ and $\mathbf{15}D_2$ respectively to switch the contacts of the window open relay 13U from the state denoted by solid line to the state denoted by dashed line as shown in FIG. 2 and, at the same time, the contacts of the window close relay 13D from the state denoted by solid line to the state denoted by dashed line as shown in FIG. 2. At this point of time, the power supply voltage between both terminals of the window open/close motor 12 from the power supply terminal 18. Consequently, the window open/close motor 5 will not rotate in any direction and therefore the driver's seat side window will not be opened or closed.

In the above-mentioned anti-flooding operations, if any of the window operating units is flooded and a partial short circuit occurs with the power supply voltage supplied between both terminals of the window open/close motor 12, this state remains unchanged, thereby preventing the window open relay 13D or the window close relay 13U from being switched out of control due to the short circuit and the window open/close motor 12 from being erroneously operated.

At this moment, if the driver manually operates the driver's seat side window open switch 7D, the contacts of this switch are switched from the state denoted by solid line to the state denoted by dashed line as shown in FIG. 2 and the power supply voltage is supplied to both terminals of the window close relay 13U from the power supply terminal 18, driving of the window close relay 13U is stopped, upon which the contacts are returned to the state denoted by solid line as shown in FIG. 2. At this moment, the power supply voltage is supplied to the window open/close motor 12 through the contacts of the window open relay 13D from the power supply terminal 18 to rotate the window open/close motor 12 in the other direction, thereby opening the driver's seat side window. Consequently, the driver can escape from inside the automobile through the opened driver's seat side window.

When the submersion detection signal is supplied to the motor drive controller 25 of the next-to-driver seat side window operating unit 2 through the signal transmission line 6, the same operation as that of the motor drive controller 15 performed when the submersion detection signal was supplied. Then, when the passenger in the next-to-driver seat manually operates the next-to-driver seat side window open switch 21D, the window open/close motor 22 operates such that the next-to-driver seat side window opens. Consequently, the passenger in the next-to-driver seat can escape from inside the submerged automobile through the opened next-to-driver seat side window.

When the submersion detection signal is supplied to the motor drive controller of the rear right seat side window operating unit 3 and the motor drive controller of the rear left seat side window operating unit 4 through the signal transmission line 6, the motor drive controller of the rear right seat side window operating unit 3 and the motor drive controller of the rear left seat side window operating unit 4 operate in the same manner as the motor drive controller 15 with the submersion detection signal supplied, thereby taking anti-flooding measures. When the passenger in the rear right seat or the rear left seat manually operates the own seat window open switch, the window open/close motor rotates such that the own seat side window opens. Consequently, the passenger in the rear right seat or the rear left seat can escape from the inside the submerged automobile through that window.

In the above operational example, the submersion detector 17 of the driver's seat side window operating unit 1 operates first when the automobile is flooded, thereby outputting the submersion detection signal from the submersion detector 17. If the submersion detector 27 of the next-to-driver seat side window operating unit 2 operates first and the submersion detection signal is outputted from the submersion detector 27, the submersion detection signal is supplied to the driver's seat side window operating unit 1, the rear right seat side window operating unit 3, and the rear left seat side window operating unit 4 from the next-to-driver seat side window operating unit 2 through the signal transmission line 6. The operations to be performed by the motor drive controllers 15 and 25 of the window operating units 1 through 4 are the same as those described above.

Thus, according to the power window apparatus as the first mode for carrying out the invention, when the inside of an automobile is flooded, any of the submersion detector sensors 17S and 27S of the submersion detectors 17 and 27 respectively disposed in the driver's seat side window operating unit 1 and the next-to-driver seat side window operating unit 2 respectively detects the flooding, and the corresponding submersion detector 17 or 27 outputs a submersion detection signal, the same is supplied to the motor drive controllers 15 and 25 of the window operating units and, at the same time, to the motor drive controller 25 and 15 of the other window operating units 2, 1, 3, and 4 through the signal transmission line 6. Consequently, anti-flooding measures are taken on each of the window operating units 1 through 4. When the driver or passenger in each seat operates the window open switch 7D and 21D of the own seat, the window of that seat is immediately opened for escape from the inside of the flooded automobile.

Further, according to the power window apparatus as the first mode for carrying out the invention, the submersion detection signal can be supplied in the form of an electrical signal constituted by a direct-current voltage from the window operating unit of one seat to the window operating units of the other seats. This novel setup provides a power window apparatus which is highly reliable in operation.

Figure 4:
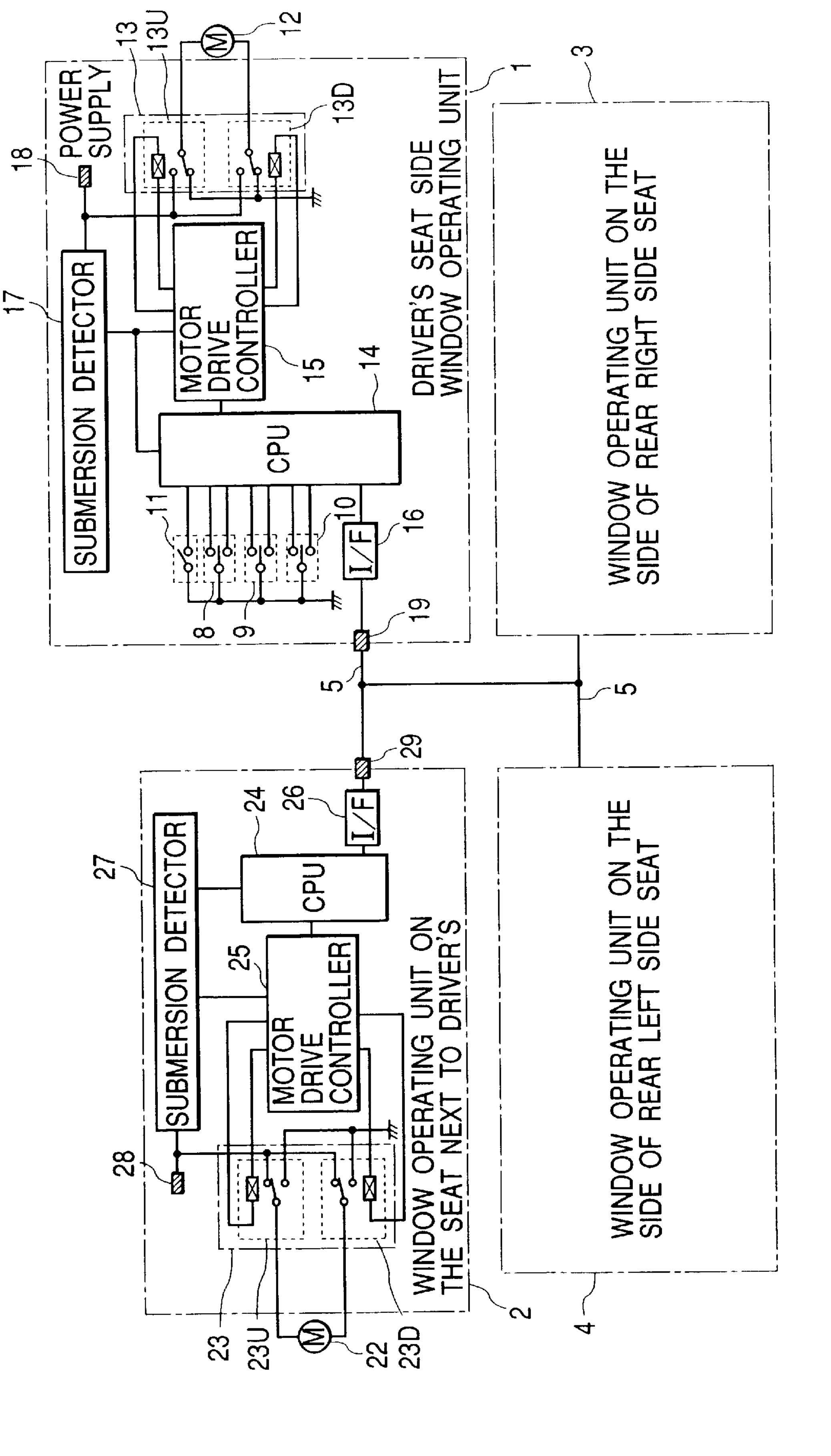
FIG. 4 is a circuit diagram illustrating the configuration of the main portion of a power window apparatus practiced as a second mode for carrying out the invention.
Figure 5:
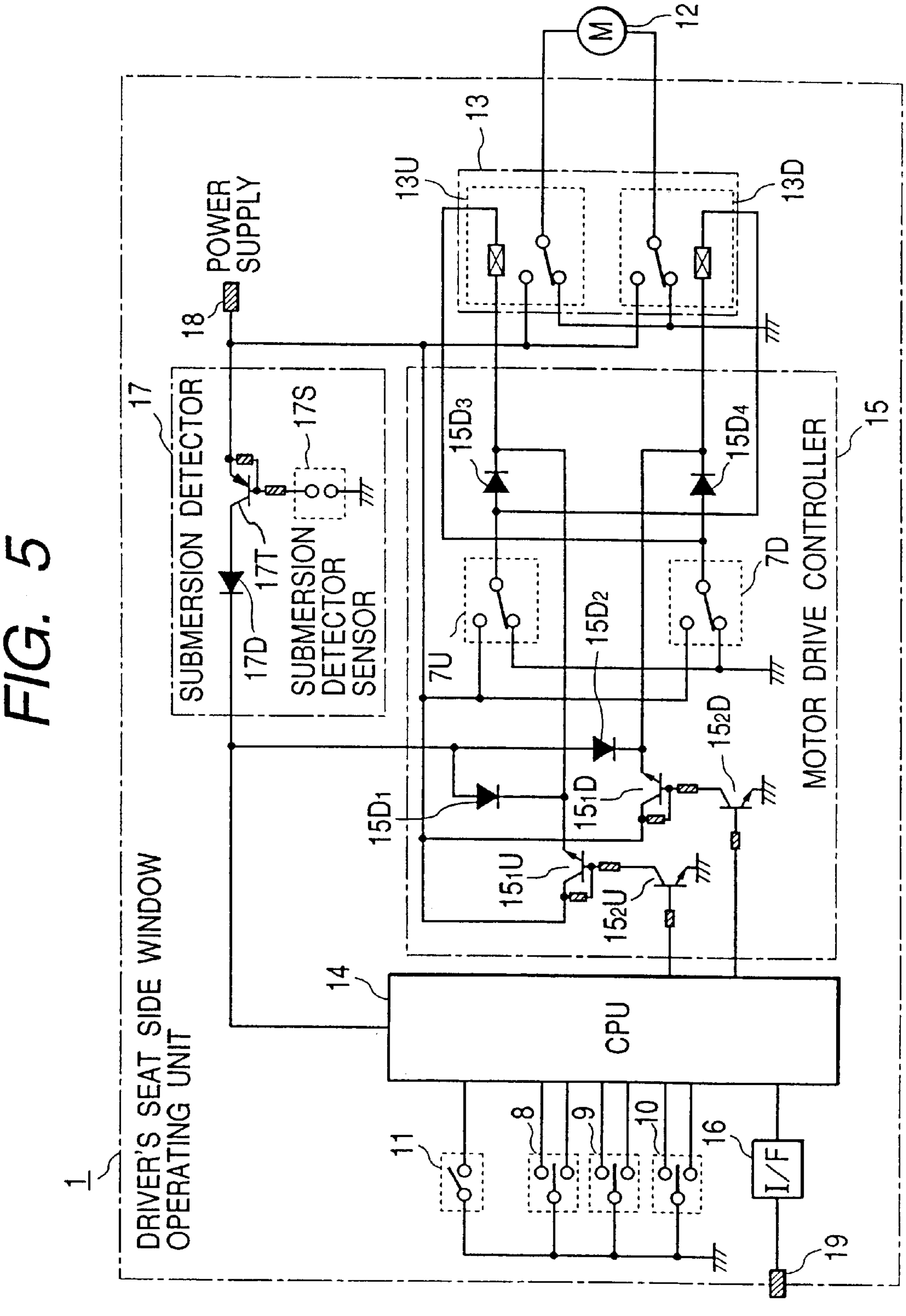
FIG. 5 is a circuit diagram illustrating a detailed configuration of the driver's seat side window operating unit of the second mode shown in FIG. 4.
Figure 6:
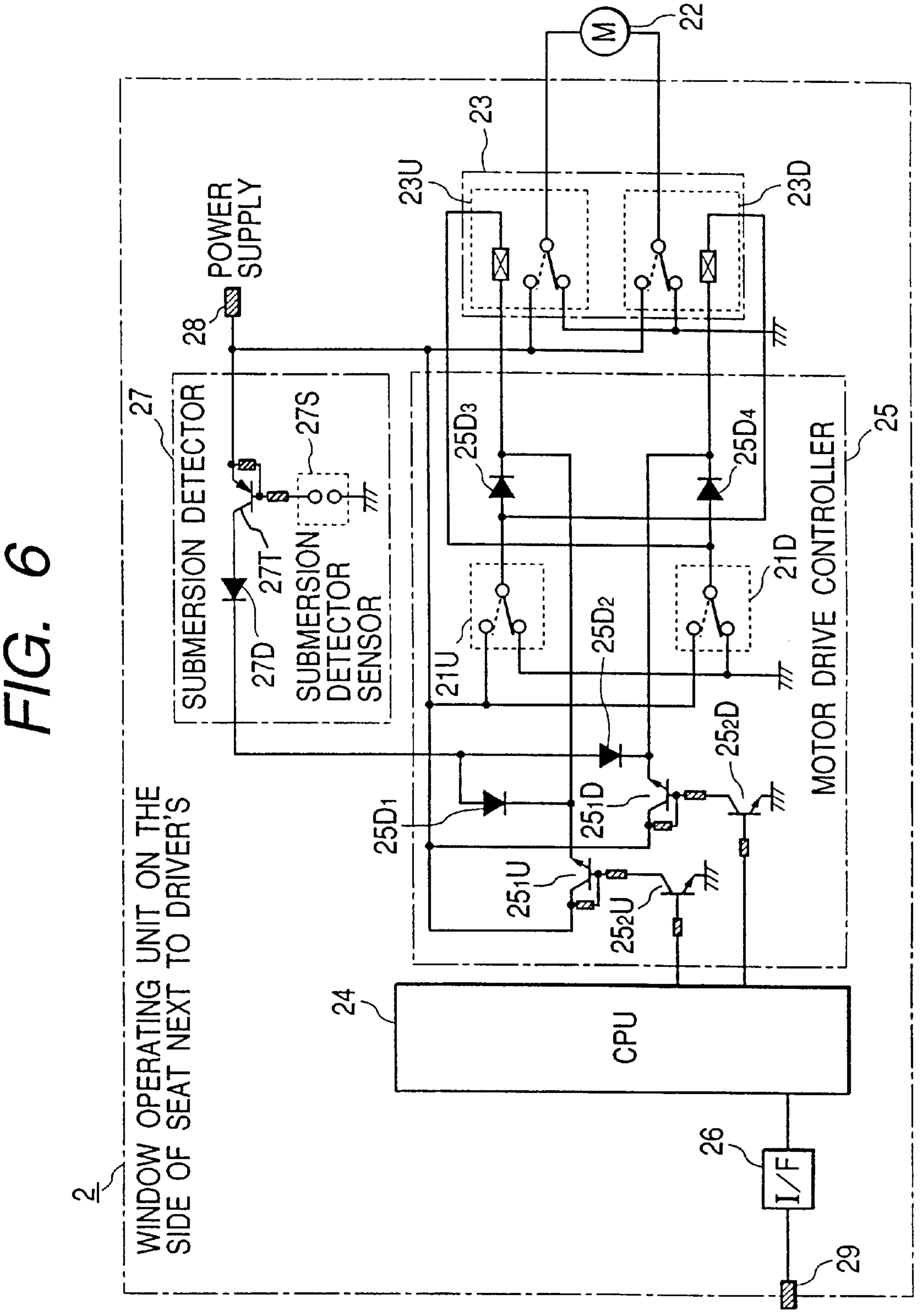
FIG. 6 is a circuit diagram illustrating a detailed configuration of the next-to-driver seat side window operating unit of the second mode shown in FIG. 4.

FIG. 4 is a circuit diagram illustrating the configuration of the main portion of a power window apparatus practiced as a second mode for carrying out the invention. FIG. 5 is a circuit diagram illustrating a detailed configuration of the driver's seat side window operating unit of the second mode shown in FIG. 4. FIG. 6 is a circuit diagram illustrating a detailed configuration of the next-to-driver seat side window operating unit of the second mode shown in FIG. 4.

It should be noted that, referring to FIGS. 4 through 6, components similar to those previously described with reference to FIGS. 1 through 3 are denoted by the same reference numerals.

The differences in configuration between the second mode and the first mode for carrying out the invention are as follows. In the first mode, the driver's seat side window operating unit 1, the next-to-driver seat side window operating unit 2, the rear right seat side window operating unit 3, and the rear left seat side window operation unit 4 each have the signal transmission line connector terminals 20 and 30, between which the signal transmission line 6 is connectedly disposed. The submersion detection signal is transmitted to the other window operating units through this signal transmission line 6. In the second mode for carrying out the invention, however, none of the driver's seat side window operating unit 1, the next-to-driver seat side window operating unit 2, the rear right seat side window operating unit 3, and the rear left seat side window operation unit 4 has signal transmission line connector terminals 20 and 30 and therefore the signal transmission line 6 is not connectedly disposed between the signal transmission line connector terminals 20 and 30. The submersion detection signal is therefore transmitted to the other window operating units through the bus line 5. The other portions are the same between these embodiments.

Therefore, the configuration of the second mode will not be described any further.

The operation of the second mode differs from that of the first mode only in the manner of transmitting the submersion detection signal from the window operating unit of one seat to the window operating units of the other seats.

Therefore, the operation of the second mode will be described only in what follows, the other description being skipped.

The submersion detection signal is transmitted in the following manner in the second mode. When any of the submersion detector sensor 17S and 27S of the submersion detectors 17 and 27 respectively detects flooding, for example, if the submersion detector sensor 17S of the submersion detector 17 detects flooding and a submersion detection signal is outputted from the submersion detector 17, the submersion detection signal is supplied to the motor drive controller 15 and, at the same time, to the controller 14.

At this moment, the motor drive controller 15 performs the operation of taking such anti-flooding measures as described before by supplying the submersion detection signal. The controller 14 converts the supplied submersion detection signal into the submersion detection information signal which is suitable for transmission over the bus line 5 and transmits this submersion detection information signal along with other information signals in a time division manner over the bus line 5 to the next-to-driver seat side window operating unit 2, the rear right seat side window operating unit 3, and the rear left seat side window operating unit 4.

In the next-to-driver seat side operating unit 2, the controller 24 converts the submersion detection information signal supplied over the bus line 5 into the original submersion detection signal constituted by a direct-current voltage and supplies this submersion detection signal to the transistor $25_2$D and the transistor $25_2$U to conduct these transistors, which in turn conduct the transistor $25_1$D and the transistor $25_1$U. At this moment, the power supply voltage at the power supply terminal 28 is supplied to the window open relay 23D and the window close relay 23U of the motor rotational direction selector relay 23 through the conducting transistors $25_1$D and $25_1$U, thereby switching the contacts of the window open relay 23D and the window close relay 23U from the state denoted by solid line to the state denoted by dashed line as shown in FIG. 6. This switching supplies the power supply voltage to both terminals of the window open/close motor 22 to execute anti-flooding measures. Then, manually operating the next-to-driver seat side window open switch rotates the window open/close motor 22 in the other direction, thereby opening the window on the next-to-driver seat.

Likewise, in the rear right seat side window operating unit 3 and the rear left seat side window operating unit 4, their controllers convert the submersion detection information signal supplied over the bus line 5 into the original submersion detection signal constituted by the direct-current voltage. By use of this submersion detection signal, the anti-flooding measures are taken. Then, manually operating the window open switch of the corresponding window operating unit rotates the window open/close motor in the other direction, thereby opening the window of the rear right seat side or the rear left seat side.

In this case too, when the submersion detector sensor 27S of the submersion detector 27 of the next-to-driver seat side window operating unit 2 detects flooding before any other sensors, the submersion detector 27 outputs a submersion detection signal and the controller 24 generates the corresponding submersion detection information signal. This submersion detection information signal is transmitted over the bus line 5 to the driver's seat side window operating unit 1, the rear right seat side window operating unit 3, and the rear left seat side window operating unit 4, upon which the same operation as mentioned above takes place in each of the window operating units 1 through 4.

Thus, according to the power window apparatus of the second mode for carrying out the invention, the signal transmission line 6 needs to be connectedly disposed between the window operating units 1 through 4, thereby simplifying the overall configuration of the apparatus, while retaining the advantages of the first mode.

In the above-mentioned modes, the submersion detectors 17 and 27 are connectedly disposed for the driver's seat side window operating unit 1 and the next-to-driver seat side window operating unit 2 respectively. It will be apparent that the submersion detector may also be disposed for one, two, three, or all of the driver's seat side window operating unit 1, the next-to-driver seat side window operating unit 2, the rear right seat side window operating unit 3, and the rear left seat side window operating unit 4.

In this case, however, if the window operating unit for which the submersion detector is not connectedly disposed is flooded first, no anti-flooding measures are taken for that window operating unit. As the number of window operating units connectedly disposed of the submersion detector increases, it is more practicable for the automobile to detect submersion earlier by one of the submersion detectors whatever manner the submersion of the automobile takes place, thereby allowing to take prompt anti-flooding measures. However, this complicates the overall configuration of the apparatus, pushing up the fabrication cost. Therefore, preferably, the number of submersion detectors to be installed on an automobile is determined by the installation state of the power windows on that automobile.

In the above-mentioned modes, a pair of flat submersion detecting semiconductors for the submersion detector sensors 17S and 27S of the submersion detector 17 and 27 respectively as shown in FIGS. 2, 3, 5, and 6. It will be apparent that other types of submersion detecting semiconductors may also be available. For example, a pair of flat submersion detecting semiconductors interconnected in parallel, a pair of pin-type submersion detecting semiconductors opposed to each other, a pair of pin-type submersion detecting semiconductors interconnected in parallel, a pair of pin-type submersion detecting semiconductors with their tips bent to oppose each other, or a pair of pin-type submersion detecting semiconductors with their tips bent to oppose each other and interconnected in parallel.

As described and according to the invention, the submersion detecting means is arranged on at least one of the driver's seat side window operating unit, the next-to-driver seat side window operating unit, the rear right seat side window operating unit, and the rear left seat side window operating unit. When the automobile is flooded, the submersion detecting signal outputted from the submersion detecting means that detected the flooding before the other submersion detecting means is supplied to the drive control means of each window operating units for taking anti-flooding measures. This prevents the erroneous anti-submersion operation from being caused by flooding. The driver and passengers can operate the window open switch of the window operating unit on own side, thereby escaping from inside the submerged automobile through the opened window without difficulty.

Further, according to the invention, if the submersion detecting means is disposed on each of the driver's seat side window operating unit, the next-to-driver seat side window operating unit, the rear right seat side window operating unit, and the rear left seat side window operating unit, submersion can be detected in an earlier stage than otherwise, thereby preventing the erroneous anti-submersion operation from being caused by flooding.

Further still, according to the invention, in the stage in which a submersion detection signal has been outputted from the submersion detecting means of the window operating unit that first detected flooding among the window operating units disposed of the submersion detecting means, anti-flooding means can be taken on all window operating units by use of this submersion detection signal. This allows each of those trapped inside the submerged automobile to quickly open the window to escape.

Further yet, according to the invention, the submersion detection signal is transmitted in the form of an electrical signal from the window operating unit of one seat to the window operating units of the other seats, thereby providing a power window apparatus highly reliable in operation.

What is claimed is:

1. A power window apparatus comprising: a driver's seat side window operating unit comprising: a manually operated first window open switch, a manually operated first window close switch, first motor driving means for driving a first motor to open and close a driver's seat side window, first motor drive control means for controlling said first motor driving means according to an operation of said first window open switch and said first window close switch, and a passenger's seat side window operating unit comprising: a manually operated second window open switch, a manually operated second window close switch, second motor driving means for driving a second motor to open and close a passenger's seat side window, second motor drive control means for controlling said second motor driving means according to an operation of said second window open switch and said second window close switch, wherein at least one of said driver's seat side window operating unit and said passenger's seat side window operating unit comprises submersion detecting means having an output for delivering a submersion detection signal being generated upon a detection of a submersion of said submersion detecting means; said output of said submersion detecting means being concurrently coupled to said first and said second motor drive control means such that said detection signal biases said first and said second motor drive control means to maintain open or closed positions of said driver's seat side window and said passenger's seat side window, respectively, without affecting manual control of said driver's seat side window and said passenger's seat side window by said first and said second open and close switches, respectively.

2. The power window apparatus according to claim 1, wherein said driver's seat side window operating unit and said passenger's seat window operating unit each have said submersion detecting means.

3. The power window apparatus according to claim 1, wherein said driver's seat side window operating unit and said passenger's seat side window operating unit each have a signal transmission terminal coupled to said submersion detecting means and a signal transmission line, and said submersion detection signal comprises a direct-current voltage that travels over said signal transmission line.

4. The power window apparatus according to claim 1, wherein said driver's seat side window operating unit and said passenger's seat side window operating unit each have a signal transmission terminal coupled to said submersion detecting means and a signal transmission line, said signal transmission terminal is a bus line connection terminal connected to a multiplexed signal transmission bus line connected between said driver's seat side window operating unit and said passenger's seat side window operating unit, and said submersion detection signal is an information signal that is transmitted over said bus line in a multiplexed manner with other signals.

5. The power window apparatus according to claim 2, wherein a signal transmission line is connected between a signal transmission terminal of said driver's seat side power operating unit and a signal transmission terminal of said passenger's seat window operating unit, said signal transmission terminal of said driver's seat side power operating unit and said signal transmission terminal of said passenger's seat window operating unit being coupled to said submersion detecting means and said submersion detection signal is a direct-current signal voltage that travels over said signal transmission line.

6. The power window apparatus according to claim 2, further comprising a first controller interfaced to a first motor drive control means, a second controller interfaced to a second motor drive control means, and bus line connection terminals connected to a multiplexed signal transmission bus line connected between said first and said second controller, and said submersion detection signal is an information signal that is transmitted over said bus line in a multiplexed manner with other signals.

7. A power window apparatus according to claim 1, wherein each of said first and said second motor driving means comprises a window open relay and a window close relay, respectively.

8. A power window apparatus according to claim 1, wherein said manually operated first window open switch and said manually operated first window close switch couple said first motor drive control means through buffer diodes and said manually operated second window open switch and said manually operated second window close switch couple said second motor drive control means through second buffer diodes.

9. A power window apparatus according to claim 1, wherein said driver's seat side window operating unit comprises an open/close switch for opening and closing said passenger's seat side window, and said second motor drive control means comprises a plurality of transistors configured to control the opening and closing of said passenger's seat side window in response to said open/close switch.

10. A power window apparatus according to claim 1, wherein said submersion detecting means comprises a submersion detecting sensor comprised of a pair of submersion detecting conductors.

11. A power window apparatus according to claim 10, wherein said pair of submersion detecting conductors are configured to conduct a common signal when coupled by a fluid.

12. A power window apparatus to be used in a vehicle comprising:

a manual open window switch;

a manual close window switch;

a motor driver comprising a first and a second input and a first and a second output, said first input coupled to said manual open window switch and said second input coupled to said manual close window switch;

a motor comprising a first and a second motor input, said first motor input coupled to said first motor driver output and said second motor input coupled to said second motor driver output; and a submersion detector comprising an output coupled to said first and said second input of said motor driver, said submersion detector being configured to electrically bias said first and said second input of said motor driver to prevent said motor from generating a mechanical motion when a submerged condition is detected unless said motor is actuated by said manual open window switch which actuates said motor to generate a mechanical motion in a window-opening direction or actuated by said manual close window switch which actuates said motor to generate a mechanical motion in a window-closing direction.

13. The power window apparatus of claim 12 wherein said electrical bias is a fixed voltage.

14. The power window apparatus of claim 12 further comprising a second manual open window switch, a second manual close window switch, a second motor driver coupled to said second manual open window switch and said second manual close switch, and a second motor, wherein said submersion detector is further configured to electrically bias said second motor driver concurrently with said motor driver to prevent said second motor from generating a mechanical motion when said submerged condition is detected unless said second motor is actuated by said second manual open switch which actuates said second motor to generate a mechanical motion in said window-opening direction or actuated by said second manual close switch which actuates said second motor to generate a mechanical motion in said window-closing direction.

15. The power window apparatus of claim 12 wherein said first input of said motor driver comprises a window-open input configured to actuate said motor to generate a mechanical motion in a window-opening direction and said second input of said motor driver comprises a window-close input configured to actuate said motor to generate a mechanical motion in a window-closing direction.

16. The power window apparatus of claim 14 further comprising an open/close switch coupled to an electronic controller configured to actuate said second motor when a submerged condition is detected.

* * * * *